April 20, 1943. D. J. SMITH 2,316,997
TENSIONING MEANS FOR CHAIN SAWS
Filed Aug. 29, 1940
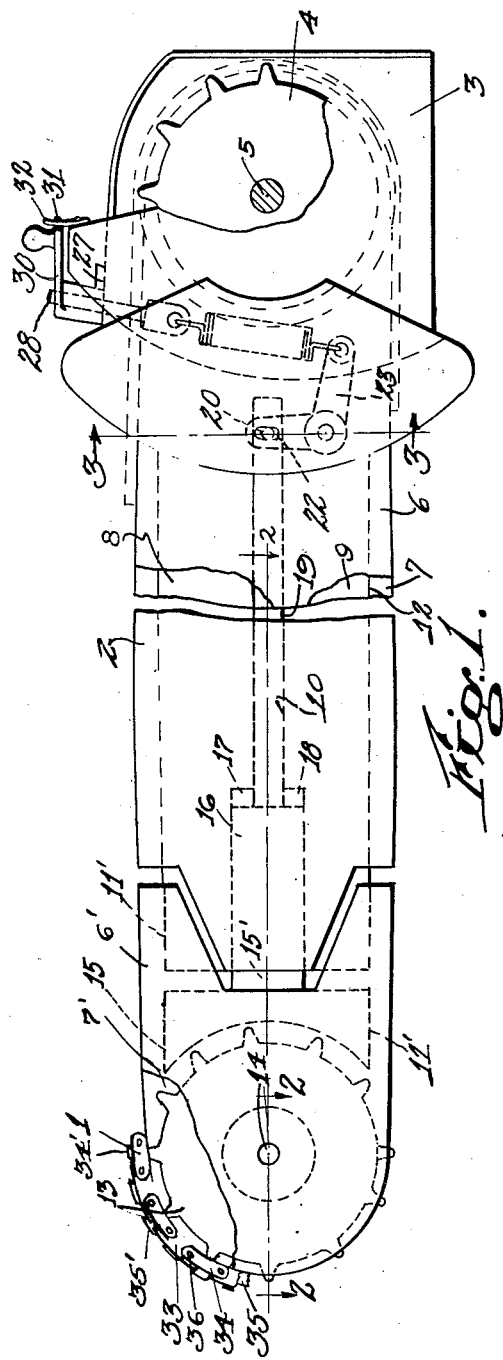
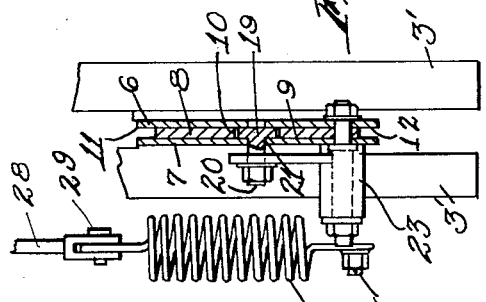
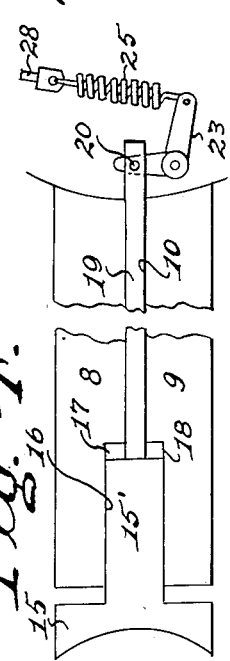
Inventor:
Donald J. Smith
By Charles A. Warren
Attorney Patented Apr. 20, 1943

2,316,997

UNITED STATES PATENT OFFICE 2,316,997

TENSIONING MEANS FOR CHAIN SAWS

Donald J. Smith, Vancouver, British Columbia, Canada, assignor to Reed-Prentice Corporation, Worcester, Mass., a corporation of Massachusetts Application August 29, 1940, Serial No. 354,645

5 Claims. (Cl. 143—32)

The present invention relates to power driven chain saws especially adapted for timber cutting and particularly to a mechanism by which the saw chain is maintained under tension.

In prior devices of this character the saw chain, which is guided around an elongated substantially oval or elliptical frame, is maintained reasonably tight on the frame by a manual adjustment which provides for varying the spacing between the drive sprocket at one end of the frame and the opposite end of the frame around which the saw is guided. As the chain becomes loose on the frame, the saw must be stopped and the tension mechanism adjusted so that the saw chain may function satisfactorily. The principal object of the present invention is to provide a mechanism by which the saw chain may be automatically maintained under a predetermined tension at all times.

In the felling or cutting up of sizable timber it is frequently necessary, in order that the saw may not bind during the cutting, to leave uncut a portion of the timber adjacent the start of the saw cut. To do this it is essential that the saw be made so that it may cut at the outer end of the frame as the saw is fed longitudinally and for this purpose it is essential that the leading end of the saw frame be so arranged that the saw chain at this point is resiliently supported. A further feature of the invention resides in the provision of a mounting by which this result may be accomplished.

Other and further objects and advantages of the invention will hereinafter more fully appear from the following description taken in connection with the accompanying drawing, in which—

Fig. 1 is a side elevation of a chain saw embodying the invention.

Fig. 2 is a sectional view along the line 2—2 of Fig. 1.

Fig. 3 is a sectional view along the line 3—3 of Fig. 1, on an enlarged scale.

Fig. 4 is a fragmentary view of a portion of the parts of Fig. 1, with the outer frame plates removed.

With reference to the drawing, the saw chain 1 is guided about an elongated substantially oval or elliptical frame 2 and is driven from a suitable motor, not shown, mounted on a bracket 3 securely attached to one end of the frame. A drive sprocket 4 mounted on the drive shaft 5 of the motor engages with the links of the chain and provides for a movement of the chain around the frame. It will be understood that the position of the axis of the drive sprocket with respect to the frame is fixed, since the motor is securely fastened to the bracket 3. On opposite sides of the frame 2 adjacent the drive sprocket are positioned guide brackets 3', which have their outer edges arcuate for engagement with the timber on opposite sides of the saw kerf to guide the saw during its operation.

The saw frame 2, the outer end of which is movable with respect to the main section, has its main section made up of opposed and correspondingly shaped outer plates 6 and 7 spaced apart by inner plates 8 and 9. These inner plates are coplanar, as shown, and the opposed inner edges of the plates are spaced from each other to define a slot 10. The outer edges of the plates 8 and 9 are spaced inwardly from the outer edges of the outer plates to define slots 11 and 12, with which the inner links of the saw chain engage for guiding the saw on the frame. The several plates are securely welded or riveted together so that there are no projections on the outer sides of the outer plates.

A sprocket 13 supports the chain adjacent the outer end of the frame and guides the chain around the end thereof. This sprocket is journalled on a large diameter pin 14 between opposed plates 6' and 7', the inner ends of which are spaced from the ends of the main plates 6 and 7 to allow for a relative endwise movement between the two parts of the saw frame. The plates 6' and 7' are held in spaced relation to each other by an inner plate 15 having a tongue 15' thereon extending within a comparatively wide slot 16 provided by notches 17 and 18 formed in the inner plates 8 and 9 respectively. To provide for a more rigid construction for supporting the sprocket, the inner plates 8 and 9 of the main section of the frame project beyond the outer plates 6 and 7 at the outer ends thereof, and are received between projecting portions of the outer plates 6' and 7'. It will be understood that the plate 15 is narrower than the plates 6' and 7' to provide a slot 11' forming a continuation of the slots 11 and 12, and the plate 15 is also cut away to avoid interference with the sprocket, the teeth of which project beyond the outer edges of the plates 6' and 7' to engage with the saw chain.

Positioned in the slot 10 is a flat bar 19 having at its inner end a projecting stud 20 movable in a slot 21 in the outer plate 7. The stud engages in a slot 22 in one end of a bell crank lever 23 which is pivoted on a stud 24 positioned in the frame 2. The other end of the bell crank lever has secured thereto one end of a coil spring 25 as by a suitable bolt 26. A small bracket 27 mounted on the motor bracket 3 has an opening through which projects a threaded stud 28, the lower end of which is secured to the other end of the spring 25 by a pin 29. On the upper end of the stud 28 is a crank 30 which provides for adjustment of the tension on the spring 25. A protuberance 31 on the crank engages with an opening in a spring retainer 32 to hold the crank in adjusted position. The end of the bar 19 engages the tongue 15' and thus the tension of the spring 25 is transmitted to the chain.

It will be understood that the tension on the spring is transmitted through the bell crank lever and the bar 19 to maintain a constant pressure forcing the sprocket in the outer part of the frame in a direction away from the drive sprocket which is mounted in the inner part of the frame, and thereby maintains a predetermined constant tension on the saw chain. This tension being under the control of a spring provides for some resiliency and it has been found that this resiliency makes possible the use of the saw for mortising or for other cutting in which it may be desirable that the saw be forced endwise through the timber.

The saw chain may be of any well known construction, but preferably has inner links 33 of a thickness to fit within the slots 11 and 12 and outer connecting links 34 and 35 which carry cutting teeth 34' and 35'. The pins 36 holding the links together are flush with the outer surfaces of the outer links so that the saw chain may pass through the saw cut.

Similarly, the frame of the saw is of a total thickness no greater than the total thickness of the saw chain so that the frame, made up as it is of a main section and an auxiliary section, may also pass within the saw kerf. The resilient mechanism by which the two sections of the frame are urged endwise away from each other does not increase the frame thickness in any way, and even at the end of the auxiliary section the presence of the supporting sprocket does not make the frame thickness great enough to interfere with passage of the frame through the saw kerf. Thus the saw may be fed endwise through timber when this is desirable, and the tension will still be maintained on the saw chain since the spring is positioned at the motor end of the saw.

I claim:

1. In a chain saw construction, a frame, a saw chain extending around and guided by the frame, said frame having a main section and an outer section movable with respect to said main section, a bar extending through said main section and connecting with the end section, and a spring adjacent the end of the main section of the frame remote from the outer section, said spring acting on said bar for urging said end section away from said main section and thereby applying a tension to the saw chain.

2. In a chain saw construction, a frame, a saw chain extending around and guided by the frame, said frame having a main section and an outer end section movable endwise with respect to the main section, each section of the frame being made up of an inner plate and opposed outer plates with the inner plate of one of the sections extending between the outer plates of the other section for holding the sections in predetermined relation to each other, and resilient means adjacent to the end of the main section remote from the outer end section, said means acting on the outer section for urging the latter away from the main section and thereby applying a tension to the chain saw, said resilient means including a bar positioned between the outer plates of the main section and engageable with said end section.

3. In a chain saw construction, a frame, a saw chain extending around and guided by the frame, said frame having a main section and an outer end section movable endwise with respect to the main section, each section of the frame being made up of an inner plate and opposed outer plates with the inner plate of one of the sections extending between the outer plates of the other section for holding the sections in predetermined relation to each other, a bar extending through said main section between the outer plates thereof and connecting with the end section and a spring mounted adjacent to the end of the main section remote from said outer end section, said spring acting on said bar for urging said end section away from the main section and thereby applying a tension to the saw chain.

4. In a chain saw construction, a frame, a saw chain extending around and guided by the frame, said frame having a main section and an outer end section movable endwise with respect to the main section, each section of the frame being made up of an inner plate and opposed outer plates with the inner plate of one of the sections extending between the outer plates of the other section for holding the sections in predetermined relation to each other, each of said sections being free of projections and of less thickness than the width of the saw chain, a bar extending through said main section between the outer plates thereof and communicating at its outer end with the end section and a spring acting on the other end of said bar for urging said end section away from the main section and thereby applying tension to the saw chain.

5. In a chain saw construction, a frame, a saw chain extending around and guided by the frame, the latter having a main section and an outer end section movable endwise with respect to the main section, each section of the frame being made up of an inner plate and opposed outer plates, with the inner plate of one of the sections extending between the outer plates of the other section for holding the sections in alinement with each other and for permitting relative movement between the sections, said outer end section being free of projections and of less thickness than the width of the saw chain over the entire area thereof, a bar extending through said main section and communicating at its outer end with the end section, and a spring acting on the other end of said bar for urging said end section away from the main section and thereby applying tension to the saw chain.

DONALD J. SMITH.